United States Patent [19]

Champagne et al.

[11] Patent Number: 4,880,200

[45] Date of Patent: Nov. 14, 1989

[54] LADDER BRACKET

[76] Inventors: Joel Champagne; Rejean Champagne, both of 75 Groveland Terr., Newington, Conn. 06111

[21] Appl. No.: 280,435

[22] Filed: Dec. 6, 1988

[51] Int. Cl.⁴ .............................................. F16M 13/00

[52] U.S. Cl. .................................... 248/547; 248/304; 248/339; 182/93; 182/206

[58] Field of Search ............... 248/547, 339, 303, 301, 248/304; 182/93, 206

[56] References Cited

U.S. PATENT DOCUMENTS

| | | | |
|---|---|---|---|
| 1,018,877 | 2/1912 | Chickering | 182/206 |
| 2,661,098 | 12/1953 | Wannop . | |
| 2,823,808 | 2/1958 | Hindi . | |
| 3,199,820 | 8/1965 | Thompson | 248/339 |
| 3,235,218 | 4/1966 | Graham . | |
| 3,294,356 | 12/1966 | Sherman | 248/547 X |
| 3,317,167 | 5/1967 | Becker et al. . | |
| 3,360,075 | 12/1966 | Gutner . | |
| 4,643,275 | 2/1987 | LeBlanc | 182/93 X |
| 4,740,043 | 4/1988 | Kennamer | 248/339 X |

FOREIGN PATENT DOCUMENTS

| | | | |
|---|---|---|---|
| 530760 | 7/1931 | Fed. Rep. of Germany | 248/304 |
| 18750 | of 1912 | United Kingdom | 248/301 |

*Primary Examiner*—Ramon S. Britts
*Assistant Examiner*—David G. Kolman
*Attorney, Agent, or Firm*—Jerry T. Kearns

[57] ABSTRACT

A ladder bracket for supporting a ladder on buildings during construction work has a pair of parallel side rails connected by transverse struts. Aligned end portions of the side rails are curved about a circular radius into hook members for engagement with a rung of a ladder to be supported. In a first embodiment, opposite ends of the side rails are each provided with three keyhole shaped apertures arranged in a triangular array. In use, the side rails are secured on an intended work surface by nails driven temporarily through the keyhole shaped apertures. In a second embodiment, a pair of securement tabs are connected by hinges to outer side edges of each of the side rails. Driven fasteners are captured within a cylindrical boss provided on each of the securement tabs. The securement tabs are pivotally mounted by the hinges and thus the driven fasteners may be secured to a variety of different intended working surfaces. The device is particularly adapted for use on steeply pitched roofs and while installing siding on buildings under construction.

1 Claim, 3 Drawing Sheets

LADDER BRACKET

BACKGROUND OF THE INVENTION

1. Field of the Invention

The present invention relates to ladder brackets, and more particularly pertains to a new and improved ladder bracket for supporting a conventional extension ladder on a building under construction. Typically, ladders must be utilized to access various portions of buildings under construction. In the past, 2×4 or other scrap lumber was utilized to form make shift blocks for securing a conventional extension ladder in a desired position. The construction of such make shift arrangements was time consuming and not entirely safe. In order to overcome this problem, the present invention provides a ladder bracket which may be quickly and easily installed on a variety of different work surfaces on buildings under construction.

2. Description of the Prior Art

Various types of brackets are known in the prior art. A typical example of such a bracket is to be found in U.S. Pat. No. 2,661,098, which issued to H. Wannop on Dec. 1, 1953. This patent discloses a wall hook including a transversely extending flange adapted to be secured by threaded fasteners to an intended supporting surface. A perpendicularly attached hook member is provided for supporting various articles. U.S. Pat. No. 2,823,808, which issued to E. Hindi on Feb. 18, 1958, discloses a rifle rack which includes independently mounted parallel side rails, each including a pair of vertically spaced hook members adapted for engagement with opposite end portions of a rifle. U.S. Pat. No. 3,235,218, which issued to H. Graham on Apr. 16, 1966, discloses an article display board which includes a plurality of vertically spaced horizontally extending slots adapted for insertion of flanged hook members for supporting and displaying various articles. U.S. Pat. No. 3,317,167, which issued to C. Becker et al on May 2, 1967, discloses a hanger bracket for tubular structures. A sheet metal member includes a first end portion bent into a circular radius, forming a hook for engagement with a tubular member. An opposite end portion of the sheet metal member is bent into a right angular flange and is provided with a keyhole shaped slot for securement to an intended mounting surface by a fastener. U.S. Pat. No. 3,360,075, which issued to K. Gutner on Dec. 26, 1966, discloses a bed ladder hook utilized in mounting a ladder on a bunk type bed. The hook member includes a right angular strip of sheet metal having one leg provided with vertically spaced apertures for engagement with threaded fasteners. End portions of each leg form channel shaped flanges.

While the above mentioned devices are suited for their intended usage, none of these devices disclose a ladder bracket suitable for supporting an extension ladder on an intended work surface of a building under construction. Additionally, none of the aforesaid devices discloses a ladder bracket having a pair of spaced parallel side rails connected by transverse supporting struts and each having a first end bent into an arcuate hook configuration and a second end provided with three keyhole shaped apertures arranged in a triangular array. Additional features of the present invention, not contemplated by the aforesaid prior art devices include the provision of securement tabs mounted by hinges on each of the side rails and including captured extensible driven fasteners. Inasmuch as the art is relatively crowded with respect to these various types of ladder brackets, it can be appreciated that there is a continuing need for and interest in improvements to such ladder brackets, and in this respect, the present invention addresses this need and interest.

SUMMARY OF THE INVENTION

In view of the foregoing disadvantages inherent in the known types of ladder brackets now present in the prior art, the present invention provides an improved ladder bracket. As such, the general purpose of the present invention, which will be described subsequently in greater detail, is to provide a new and improved ladder bracket which has all the advantages of the prior art ladder brackets and none of the disadvantages.

To attain this, representative embodiments of the concepts of the present invention are illustrated in the drawings and make use of a pair of parallel side rails connected by transverse struts. Aligned end portions of the side rails are curved about a circular radius into hook members for engagement with a rung of a ladder to be supported. In a first embodiment, opposite ends of the side rails are each provided with three keyhole shaped apertures arranged in a triangular array. In use, the side rails are secured on an intended work surface by nails driven temporarily through the keyhole shaped aperture. In a second embodiment, a pair of securement tabs are connected by hinges to outer side edges of each of the side rails. Driven fasteners are captured within a cylindrical boss provided on each of the securement tabs. The securement tabs are pivotally mounted by the hinges and thus the driven fasteners may be secured to a variety of different intended working surfaces. The device is particularly adapted for use on steeply pitched roofs and while installing siding on buildings under construction.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ladder bracket which has all the advantages of the prior art ladder brackets and none of the disadvantages.

It is another object of the present invention to provide a new and improved ladder bracket which may be easily and efficiently manufactured and marketed.

It is a further object of the present invention to provide a new and improved ladder bracket which is of a durable and reliable construction.

An even further object of the present invention is to provide a new and improved ladder bracket which is designed to provide a low cost of manufacture with regard to both materials and labor, and which accordingly is then available at low prices of sale to the consuming public, thereby making such ladder brackets economically available to the buying public.

Still yet another object of the present invention is to provide a new and improved ladder bracket which provides in the apparatuses and methods of the prior art some of the advantages thereof, while simultaneously overcoming some of the disadvantages normally associated therewith.

Still another object of the present invention is to provide a new and improved ladder bracket for supporting an extensible ladder on a wide variety of intended work surfaces on buildings under construction.

Yet another object of the present invention is to provide a new and improved ladder bracket having hooked end members adapted for engagement with a rung of a conventional extension ladder for securing the ladder on a steep pitched roof surface.

Even still another object of the present invention is to provide a new and improved ladder bracket including hinged securement tabs including captured driven extensible fasteners adapted for securement on a wide variety of different intended work surfaces in various different orientations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
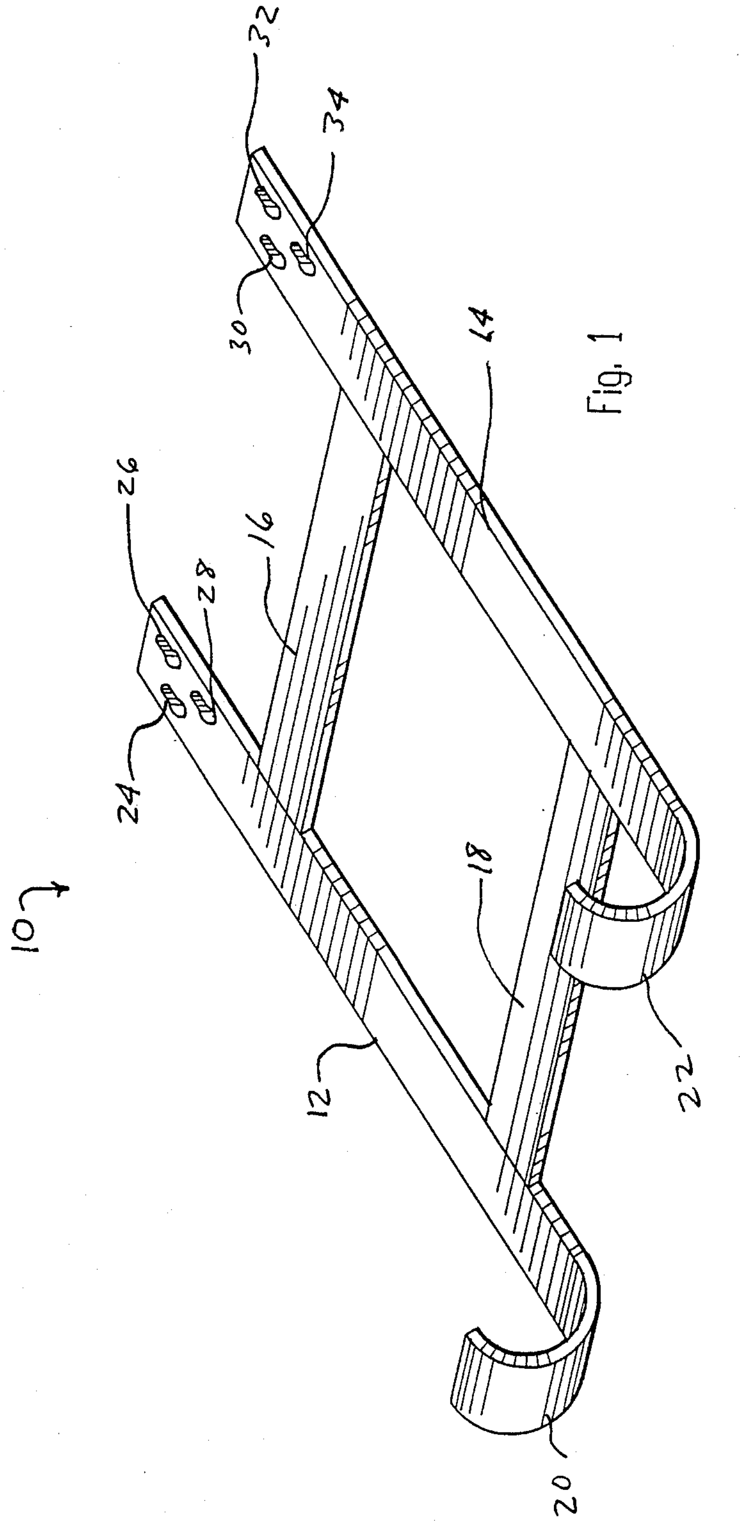
FIG. 1 is a perspective view of the ladder bracket according to the first embodiment of the present invention.

With reference now to the drawings, and in particular to FIG. 1 thereof, a new and improved ladder bracket embodying the principles and concepts of the present invention and generally designated by the reference numeral 10 will be described.

More specifically, it will be noted that the first embodiment 10 of the invention includes a pair of spaced parallel side rails 12 and 14 having respective aligned end portions 20 and 22 bent about a circular radius to form a pair of hook members. In use, the hook members are engaged with a rung of a conventional extension ladder to be supported. Opposite ends of each of the side rails 12 and 14 are provided with three keyhole shaped apertures 24, 26, 28 and 30, 32, 34, respectively. A pair of transverse struts 16 and 18 connect the side rails 12 and 14. The various elements are preferably formed from sheet metal and may be connected through any conventional means such as welding, by rivets or by threaded fasteners. In use, nails are inserted through each of the keyhole shaped apertures to secure the bracket 10 on an intended working surface, for example a steeply pitched roof. In order to remove the bracket, it is merely necessary to lift the bracket to disengage the keyhole shaped apertures from the nails.

Figure 2:
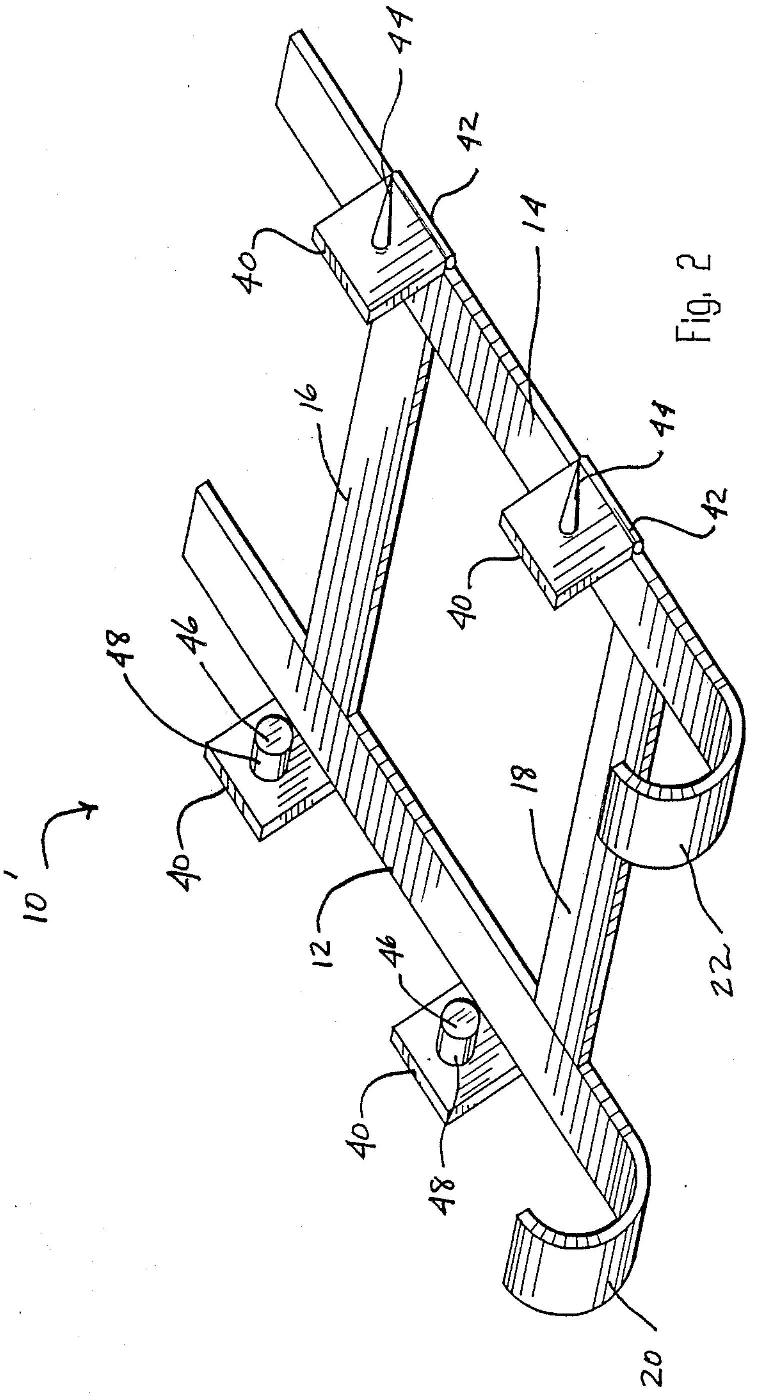
FIG. 2 is a perspective view of the ladder bracket according to the second embodiment of the present invention.

In FIG. 2, a perspective illustration is provided of a second embodiment 10" which includes a pair of spaced parallel side rails 12 and 14 connected by transverse support struts 16 and 18 and including respective hooked end portions 20 and 22. The apertures of the first embodiment 10 (FIG. 1) are replaced by a pair of securement tabs 40 secured to an outer side edge of each of the side rails 12 and 14 by hinges 42. The securement tabs 40 each include a hollow cylindrical boss 48 in which a driven fastener having an enlarged exterior head 46 is captured. A pointed tip portion 44 of each of the driven fasteners extends through a bottom surface of the securement tab 40. In use, each of the securement tabs 40 may be pivoted to a desired orientation about the hinge 42, and the enlarged head portion 46 of the captured fasteners struck by a hammer. This drives the pointed tip 44 of the fastener into the intended work surface, thus securing the ladder bracket 10" in the desired orientation. Because of the pivotal mounting of the securement tabs 40, the device is particularly adaptable, and may be installed in a wide variety of orientations. The device is especially useful for installing siding on buildings under construction.

Figure 3:
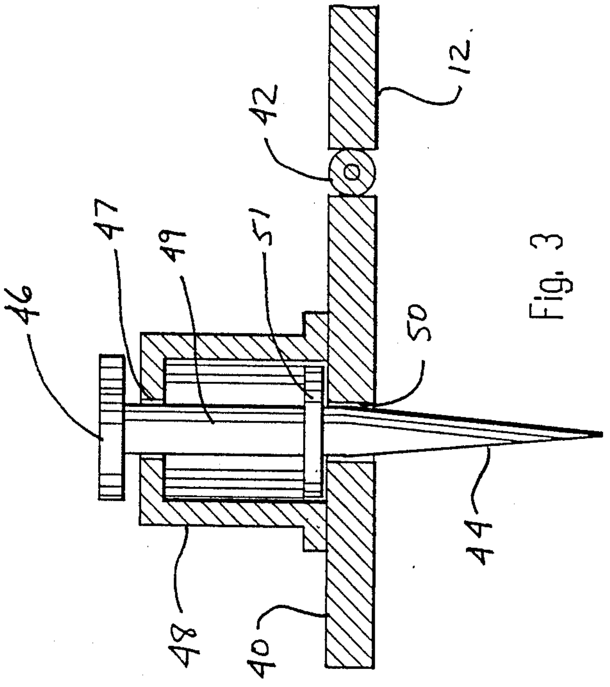
FIG. 3 is a cross sectional detail view illustrating the construction of the securement tab of the ladder bracket according to the second embodiment of the present invention.

As illustrated in the cross sectional detail view of FIG. 3, the hollow cylindrical boss 48 on each of the securement tabs 40 has a reduced diameter aperture 47 formed through a top wall thereof. An aligned reduced diameter aperture 50 is formed through the securement tab 40. The driven fastener 49 is inserted through the aligned apertures 47 and 50 and extends through the interior of the hollow boss 48. A radially extending retaining flange 51 has a diameter slightly less than the diameter of the central cylindrical hollow of the boss 48, but substantially greater than the apertures 47 and 50. Thus, the fastener 49 is captured within the boss 48.

In use, the enlarged head 46 is struck with a hammer, driving the pointed tip 44 into the intended work surface, to an extent until the retaining flange 51 is in abutment with the upper surface of the securement tab 40. To retract the fastener 49, the enlarged head 46 is engaged with a claw hammer, or pried upwardly with a tool such as a screw driver. Thus, the captured fasteners 49 may be reused indefinitely. The fasteners 49 are preferably formed from a hardened steel to provide a long service life.

Figure 4:
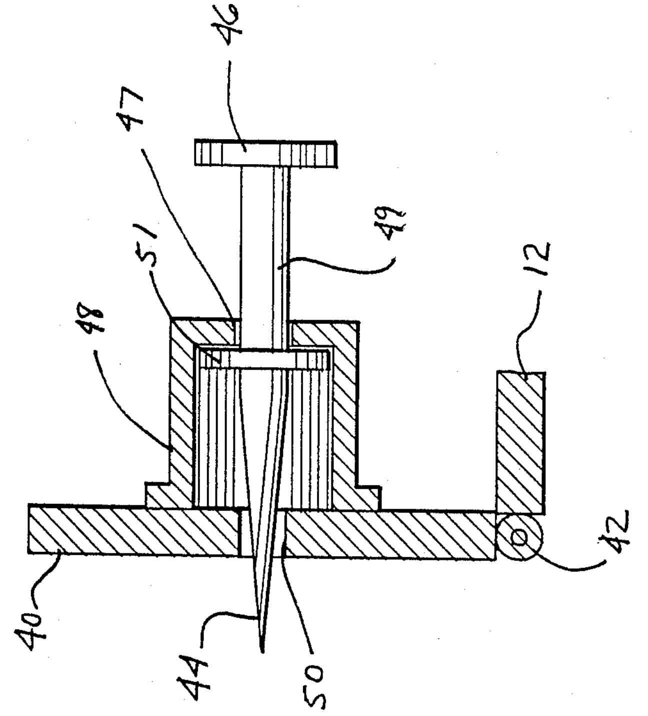
FIG. 4 is a transverse cross sectional view illustrating the range of movement of the securement tab of FIG. 3.

As illustrated in FIG. 4, the hinge 42 allows the securement tab 40 to be pivoted about a wide angular range of motion, allowing securement to a wide variety of differently configured intended work surfaces. The fastener 49 is illustrated in a retracted position, for disengaging the securement tab from the intended work surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ladder bracket for supporting a ladder having a plurality of spaced rungs on an intended work surface, comprising:

a pair of parallel side rails;

a pair of spaced transverse struts connecting said parallel side rails;

first end portions of said side rails being curved into hooks dimensioned for engagement with a ladder rung;

a plurality of securement tabs on each of said side rails, said tabs disposed in spaced aligned pairs and each connected by a hinge to an outer side edge of one of said side rails; said tabs each mounted for pivotal movement about an axis extending parallel with the longitudinal axis of said side rails;

each of said securement tabs having:

(a) a hollow cylindrical boss;

(b) aligned reduced diameter apertures extending through a top face of said boss and through said tab;

(c) an elongated fastener having an enlarged head at one end and a pointed tip at an opposite end, said fastener inserted through said aligned apertures and through said cylindrical boss, said enlarged head of said fastener disposed above said boss; and (d) an elongated diameter retaining flange on said fastener and captured within said boss, whereby said securement tabs are pivotal to a wide variety of positions to allow securement of said ladder bracket to various differently configured intended work surfaces.

* * * * *